United States Patent [19]

Liu

[11] Patent Number: 5,430,635
[45] Date of Patent: Jul. 4, 1995

[54] HIGH POWER FACTOR ELECTRONIC TRANSFORMER SYSTEM FOR GASEOUS DISCHARGE TUBES

[75] Inventor: Guang Liu, Calgary, Canada

[73] Assignee: Bertonee, Inc., Calgary, Canada

[21] Appl. No.: 161,389

[22] Filed: Dec. 6, 1993

[51] Int. Cl.[6] ............................................. H02M 5/45
[52] U.S. Cl. .................................. 363/37; 315/200 R
[58] Field of Search .................. 363/24, 37, 41, 56, 363/48; 315/200 R, 209 M, DIG. 1

[56] References Cited

U.S. PATENT DOCUMENTS

| | | | |
|---|---|---|---|
| 4,388,563 | 6/1983 | Hyltin | 315/209 X |
| 4,700,113 | 10/1987 | Stupp et al. | 315/224 |
| 4,959,765 | 9/1990 | Weinburg | 363/24 X |
| 4,987,347 | 1/1991 | Leskovec et al. | 315/209 R |

Primary Examiner—R. Skudy
Assistant Examiner—E. To
Attorney, Agent, or Firm—Jay H. Maioli

[57] ABSTRACT

A cost-effective apparatus to improve the power factor of an AC line powered electronic transformer for powering gaseous discharge tubes uses an L-C filter link between a rectifier that provides DC voltage and an inverter for converting from DC to AC. The L-C filter link and the inverter function as a power factor correction stage, while at the same time converting DC voltage to AC voltage to drive gaseous discharge tubes.

12 Claims, 6 Drawing Sheets

HIGH POWER FACTOR ELECTRONIC TRANSFORMER SYSTEM FOR GASEOUS DISCHARGE TUBES

BACKGROUND OF THE INVENTION

1. Field of the Invention

The present invention relates to electronic transformer systems for powering gaseous discharge tubes and, in particular, to high power factor systems of that kind.

2. Description of Prior Art

Electronic transformers are known to be a competitive alternative to the traditional core-and-coil transformer system for powering gaseous discharge tubes. Since such electronic transformers usually operate at frequencies of tens of kilohertz or higher, they have the advantages of smaller size, lighter weight, and better efficiency compared to core-and-coil transformers.

Today, a majority of the electronic transformers for gaseous discharge tubes use main lines as their power source, that is, the standard AC line voltage. Such transformers usually have a low power factor and cause a considerable amount of input harmonics. These transformers usually use a rectifier stage to convert AC line power to a DC voltage and use an inverter stage to convert the DC power to high frequency AC power to drive a gaseous discharge tube. A capacitor of tens or hundreds of microfarads is usually connected to the output of the rectifier stage, so that a smooth DC voltage can be obtained for the inverter stage. Nevertheless, because of this capacitor, the input current flow is blocked for a large portion of each cycle. The blockage results in an input current waveform having high current pulses, severely distorted from sinusoid. As a result, the power factor of such transformers is usually 0.4 to 0.6, which means only 40 to 60 percent of the available power is utilized.

Some power factor correction stages have been devised in the past to improve this low power factor. The most commonly used power factor correction stage in a DC power supply is essentially a boost or buck/boost converter with rectified AC, having 120 Hz ripple as input to provide a smoother DC output. Such a power factor correction stage could be added to an electronic transformer to obtain higher power factor. Nevertheless, an additional power factor correction stage introduces extra cost and reduces the efficiency of the transformer.

The invention disclosed herein provides a cost-effective apparatus to achieve a high power factor for an electronic transformer for gaseous discharge tubes.

OBJECTS AND SUMMARY OF THE INVENTION

The present invention relates to a high power factor electronic transformer system for powering gaseous discharge tubes. One preferred embodiment of the present invention comprises an RFI filter, a rectifier stage, an L-C filter link for power factor improvement, a single-MOSFET inverter, which is further divided into a power stage and a pulse width modulation (PWM) control circuit, and an over-voltage/over-current cut-off circuit.

The L-C filter link between the rectifier and the inverter is one key to the improvement in system power factor provided by this invention. In the present invention, the L-C filter link, along with a subsequent inverter stage, fulfill the function of power factor correction as well as DC-to-AC power conversion. The L-C filter link comprises an inductor and a capacitor connected as a low-pass filter. The inductance value L is selected such that at the inverter switching frequency of about 20 kHz the inductor has a much higher impedance than the equivalent load impedance across the capacitor, that is, the equivalent input impedance of the inverter, while at a lower frequency of about 120 Hz, the inductor exhibits a much lower impedance than the equivalent load impedance across the capacitor. As a result, the inductor suppresses the high frequency current spikes caused by the inverter switching operation, while allowing the DC current to pass with little attenuation. The capacitance value C is selected such that it is sufficient to suppress the high frequency voltage spikes caused by stray inductance, while exhibiting at a lower frequency a much higher impedance than the load. With the L and C parameters selected according to the above, the L-C link between the rectifier and the inverter does not cause any appreciable blockage of the rectifier current flow and the voltage across the capacitor is a rectified sine wave. The inverter is designed to operate with the rectified sine wave input and draws current from the rectifier over almost 100% of the cycle, thus allowing the inverter stage to also function as a power factor correction stage. The input current waveform becomes a sinusoid with small ripples superimposed on it, and the power factor is greatly improved, that is, it reaches above 0.9 at rated load. The L-C filter link also serves the purpose of reducing differential mode RFI.

The inverter in the preferred embodiment of the present invention comprises an output transformer, a power metal oxide semiconductor field effect transistor (MOSFET), a capacitor, and resistors for current and voltage sensing purpose. One end of the primary of the output transformer is connected to the positive terminal of the capacitor in the L-C link and the other end is connected to the drain of the power MOSFET. The source of the MOSFET is connected to the negative terminal of the L-C capacitor through a current sensing resistor. One end of the inverter capacitor is connected to the drain of the MOSFET and the other end is connected to the negative terminal of the L-C link capacitor. The secondary of the output transformer is connected directly to a gaseous discharge tube.

The unique configuration of the inverter exploits the resonant phenomenon caused by the equivalent capacitance, including the inverter capacitor C4 and the equivalent capacitance of the gaseous discharge tube from the primary side, and the equivalent inductance of the transformer, from the primary. The voltage on the power MOSFET swings up and down because of the resonance. The capacitance, inductance, and switching frequency are arranged such that the power MOSFET will turn on at the moment when the voltage on the power MOSFET is minimum. Because of the low turn-on voltage for the power MOSFET, the switching loss of the inverter is greatly reduced.

An alternative method to achieve the low MOSFET drain-source voltage at turn-on is to use one or two series capacitors at the secondary of the output transformer. In this case, the resonant circuit is formed of the series capacitor(s) and the leakage inductance of the output transformer.

The over-voltage/over-current cut-off circuit in the preferred embodiment of the present invention comprises an inexpensive resistor sensing for current and voltage signals, and these signals are ORed to feed a single comparator with a positive feedback. An LM311 can be advantageously used for the comparator. Once an over-current or over-voltage occurs, the cut-off signal remains active until the power is turned off. The over-voltage and over-current cut-off circuit not only protects the transformer from damage, but also provides a safety feature. For instance, if a neon sign installer accidentally tries to connect the neon tube to the transformer output while the power is on, he will not get hurt because the output will have been cut off. The simplicity of the protection circuit in the present invention makes the over-voltage/over-current protection very cost-effective.

Other features and advantages of the present invention will become apparent from the following description, which is to be read in conjunction with the accompanying drawings in which like reference numerals represent the same or similar elements.

DETAILED DESCRIPTION OF PREFERRED EMBODIMENTS

Detailed embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to practice the present invention.

Figure 1:
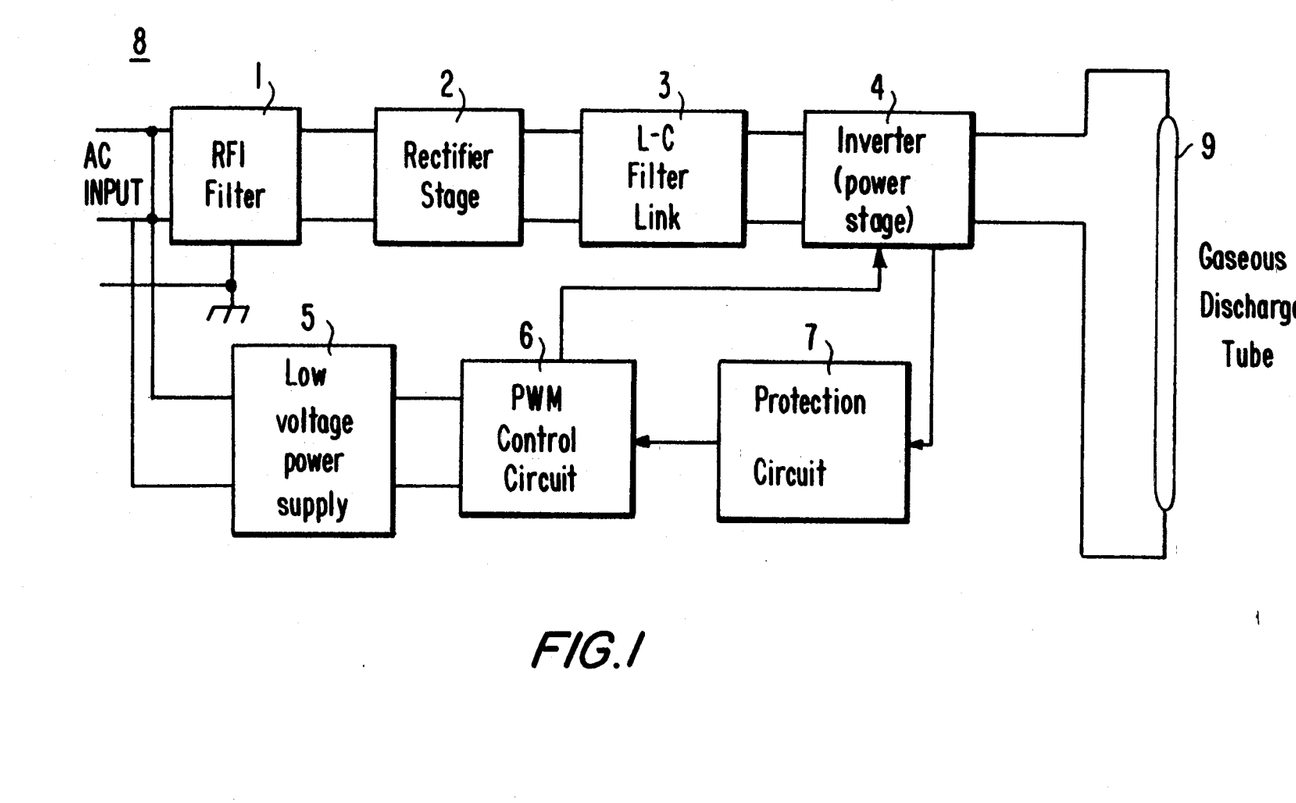
FIG. 1 is a block diagram of the principal components of a high power factor electronic transformer system according to an embodiment of the present invention.
Figure 2:
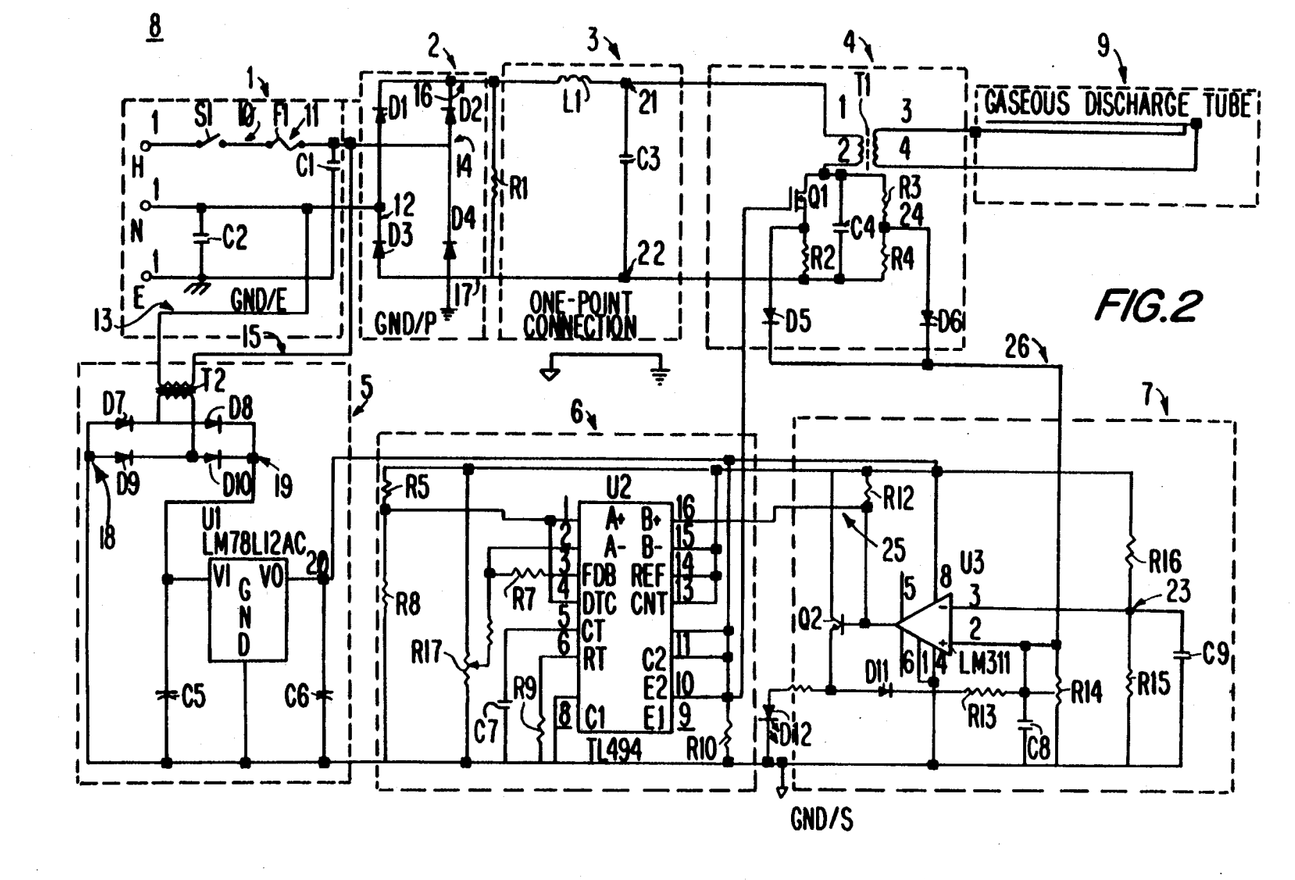
FIG. 2 is a schematic diagram of the preferred embodiment of the present invention.
Figure 3A:
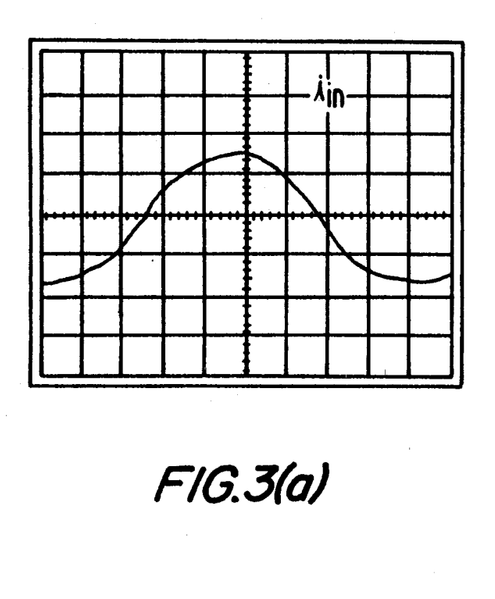
FIGS. 3(a) and 3(b) illustrate the input current waveform of the preferred embodiment of the present invention and that of a conventional electronic transformer, respectively.
Figure 3B:
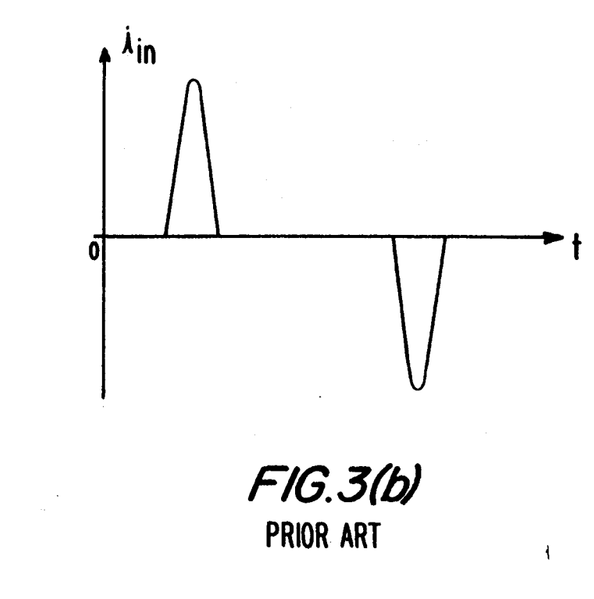

The general construction of a high power factor electronic transformer system 8 according to a first embodiment of the present invention is shown generally in FIG. 1 and in more detail in FIG. 2.

Referring to FIG. 2, system 8 includes RFI filter 1, rectifier stage 2, L-C filter link 3, an inverter power stage 4 and PWM control circuit 6, low voltage power supply 5, over-voltage/over-current cut-off circuit 7, and a gaseous discharge tube 9.

The system obtains 60 Hz AC power from terminals H (hot) and N (neutral). Terminal E is earth ground and should be connected to the third prong of the power outlet for the North American Standard. One end of switch S1 is connected to the hot wire of the power line. The power rating of the switch should be sufficient for the maximum input current and voltage. The other end of switch S1 is connected to fuse F1 through conductor 10. The current rating of the fuse F1 should be about 50% higher than the rated input current. If a fast blow fuse is used, the current rating of the fuse should be 100% higher than the rated input current. The other terminal of the fuse, depicted by reference numeral 11, is connected to an RFI filter capacitor C1. The capacitance value of C1 can be between 1 nF to 10 nF for a 120 V AC line. The voltage rating of the capacitor C1 should be 50% higher than the peak input voltage. The fuse terminal 11 is also connected to a low voltage supply transformer T2 through conductor 13, and to an input terminal 12 of the bridge rectifier. The neutral terminal N is connected to the other RFI filter capacitor C2 and to the other input terminal of the bridge rectifier, input 14. Capacitor C2 should have the same characteristics as C1. One end of capacitor C1 and capacitor C2 are tied together and connected to earth ground terminal E. Capacitors C1 and C2 form an RFI filter to reduce common mode RF emission.

Diodes D1, D2, D3, and D4 form a full bridge rectifier for converting the input AC to DC, with 120 Hz ripple. An optional bleeding resistor R1 is connected across the output of the bridge rectifier.

The low voltage supply 5 comprises a transformer T2, a low power full wave diode bridge including D7 through D10, filter capacitors C5 and C6 and a voltage regulator U1. For the circuit shown in FIG. 2, a capacity of 2 VA is sufficient for transformer T2. The input voltage of T2 comes from the power source, and the primary of T2 should match the power source voltage. The secondary voltage level should satisfy the requirements of the ICs U2 and U3 in FIG. 2, the MOSFET Q1 and the voltage drop across the voltage regulator U1. In FIG. 2, U1's (LM78L12AC) output voltage is 12 V, suitable for the ICs and the power MOSFET. The minimum input voltage for voltage regulator U1 to maintain good voltage regulation is 14.5 V. Therefore, the secondary of transformer T2 must ensure that at the output of diode bridge D7 through D10, terminals 18 and 19, the DC voltage is at least 14.5 V. Capacitor C5 is a filter capacitor that can have a value of 100 uF or higher. Capacitor C6 is an output filter capacitor, which is of a similar type.

The L-C filter link 3 comprises an inductor L1 and a capacitor C3. Inductor L1 should be capable of operating at the switching frequency of the inverter, about 20 kHz in the circuit shown FIG. 2. The inductance of L1 must be sufficiently large to suppress the high frequency current pulses caused by the inverter switching operation. That means that the impedance of L1 ($2 \times PI \times f_s \times L_1$) at the inverter switching frequency should be much higher than the load impedance at the output of the L-C link, that is, at terminals 21 and 22. At the same time, the impedance of L1 at 120 Hz ($2 \times PI \times 120 \times L_1$) should be much lower than that of the equivalent load impedance. For a 100 W electronic transformer system, the inductance can be from 1 mH to 20 mH. Higher inductance values will result in less ripple on the input current, but the size will be larger and the cost higher. Capacitor C3 should have a voltage rating of 20 % higher than the peak input voltage, which is $1.414 \times RMS$ input voltage. The capacitance value of capacitor C3 should be sufficiently large to suppress the voltage spikes caused by stray inductance, while its impedance at 120 Hz must be much higher than the equivalent load impedance. For a 100 W system with a switching frequency of 20 kHz, the value of capacitor C3 can be selected to be between 0.1 to 4.7 uF. Bigger capacitance values will provide better suppression of voltage spikes, but at a certain point, the power factor will be reduced. A low ESR type of capacitor should be used for capacitor C3.

The inverter includes a power stage 4 and PWM control circuit 6. The power stage 4 comprises an output transformer T1, a power MOSFET Q1, a resonant capacitor C4, a current sensing resistor R2, two voltage sensing resistors R3 and R4 and two diodes forming an OR logic for an over-current/over-voltage cut-off circuit 7. The transformer T1 operates in both forward and flyback mode. When the power MOSFET Q1 is turned on, the voltage from the L-C link is applied across the primary of the transformer T1. The secondary of transformer T1 will immediately have a positive voltage and current. At the same time, there will be an energy build-up in the ferrite core of transformer T1. When the power MOSFET Q1 is turned off, the energy stored in the ferrite core will generate a negative voltage and current at the secondary winding. At the same time, the equivalent leakage inductance of transformer T1 and capacitor C4 and the equivalent capacitance of the gaseous discharge tube 9 at the primary of transformer T1 form a damped resonant circuit. The voltage on the capacitor C4 is about zero when Q1 is on. When Q1 is turned off, the voltage on C4 swings up to a maximum value and then swings down to a minimum value. The leakage inductance of transformer T1, the capacitance of capacitor C4 and the switching frequency are selected such that the power MOSFET Q1 turns on when the voltage on capacitor C3 is close to minimum. This greatly reduces the switching loss of the inverter. Transformer T1's design can follow the same procedure as a flyback DC to DC converter, except that the wire size and maximum flux density should be increased to account for the positive cycle of the output current. Due to the resonant phenomenon, the voltage between the drain and source of the power MOSFET Q1 can be many times that of the input DC voltage, especially when a load is not connected to the secondary of transformer T1. The voltage across capacitor C4 is about the same as that of the voltage across the drain and source of power MOSFET Q1. To prevent damage to the inverter, power MOSFET Q1 and capacitor C4 should have a voltage rating of three times the input DC voltage. An over-voltage protection circuit will set the over-voltage cut-off limit right below the voltage rating of power MOSFET Q1 and capacitor C4. Resistors R3 and R4 are used to set the over-voltage cut-off limit and resistor R2 is a current sensing resistor. Because mains current flows through resistor R2, the power rating of resistor R2 must be relatively high. The resistance value of resistor R2 is selected so that at maximum allowable MOSFET current, the voltage drop across resistor R2 will reach the over-current cut-off threshold voltage. Similarly, resistors R3 and R4 are selected such that when the drain voltage of power MOSFET Q1 approaches maximum allowable voltage, the center point of resistors R3 and R4 will be at the same threshold voltage. It should be noted that the effect of resistor R14 may need to be considered in the calculation of values for resistors R3 and R4. The threshold voltage is determined by a voltage divider made of resistors R15 and R16 in the over-current/over-voltage cut-off circuit 7. The PWM control circuit can be implemented by various methods. The basic requirements of the PWM circuit include: a) sufficient output current to drive the power MOSFET Q1; b) easy adjustment of pulse width and frequency; and c) provision of a shut-down mode for over-current/over-voltage protection. The PWM control circuit shown in FIG. 2 is implemented with a commercially available IC TL494, designated by reference character U2. Resistors R5 and R8 form a voltage divider that is connected to a 5 V voltage reference on integrated circuit U2. The center point of the divider is connected to pin 1 and pin 4 of the integrated circuit U2. Since pin 4 is the dead-time control pin, the voltage at the center point of the divider determines the dead-time of the output pulse. Pin 1 is the positive input of an error amplifier in integrated circuit U2 and trim pot R17 is for the gain adjustment of the error amplifier. Trim pot R17 is also used to adjust the pulse width. Capacitor C7 and resistor R9 determine the frequency of the pulse width modulation signal. Pin 10 of integrated circuit U2 provides the PWM signal to drive the gate of the power MOSFET Q1. Pin 16 of integrated circuit U2 is connected to the output of the over-current/over-voltage protection circuit 7 through conductor 25. Once the voltage on pin 16 of integrated circuit U2 is higher than 5 V, the PWM signal at pin 10 of integrated circuit U2 will be cut off, that is, 0 volts, thereby turning off the power MOSFET Q1.

The over-current/over-voltage cut-off circuit 7 comprises a comparator U3, such as commercially available LM311 used in FIG. 2, for detection of an over-voltage or over-current fault. A transistor Q2 is connected as an emitter follower to drive a LED D12 for fault indication, and a resistor R11 is used for LED current limiting. Resistors R15 and R16 form a voltage divider providing the threshold voltage for the comparator U3, capacitor C9 is a decoupling capacitor, and resistor R14 and capacitor C8 provide filtering and attenuation to the fault signal sent out by the inverter power stage through conductor 26. Diode D11 and resistor R13 provide positive feedback to the comparator so that once a fault occurs, the output of the comparator U3 remains at a high level until a "power-off" reset occurs.

Since the inverter 4 operates at about 20 kHz, the inventor hereof has found that care should be taken to ensure proper layout of the circuit board. There are three "ground" points in the system: the earth ground GND/E, a signal ground GND/S and a power ground GND/P. Earth ground must be isolated from the other two grounds. Signal ground and power ground should be two separate grounds connected only at one point. The chassis of the electronic transformer system, if conductive, should be connected to the earth ground.

Prototypes of system 8 of FIG. 2 have been built with a power capacity of 100 W and these prototypes have a power factor of 0.95. Laboratory tests have been carried out to compare the prototypes with core-and-coil transformers and some commercial electronic transformer systems of similar capacity but without power factor correction. Test results show that for the same output, that is, the same brightness, the prototypes of the instant invention draw about 35% to 50% less current than the commercial units tested.

Figure 4:
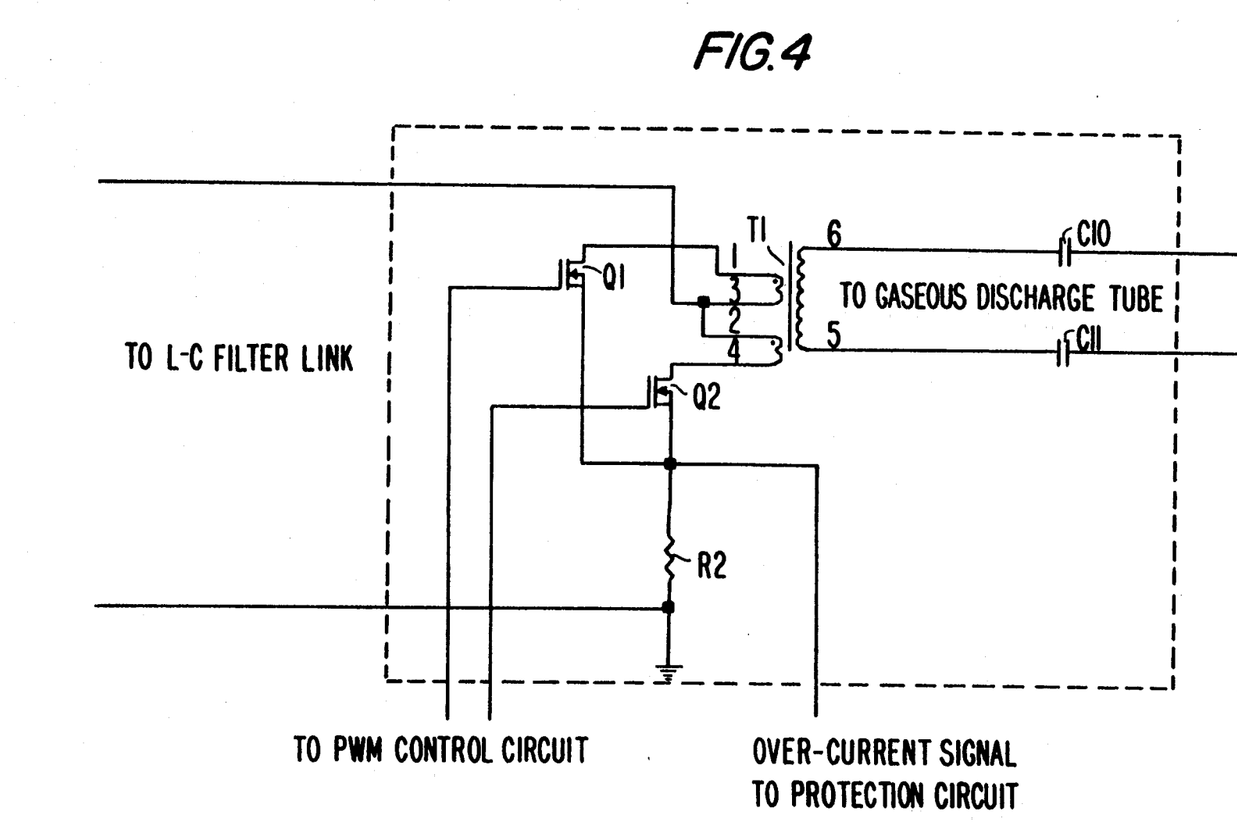
FIG. 4 illustrates an alternative inverter power stage (push-pull) for the present invention.

Alternative inverter stages can be used to replace the inverter stage 4 in the embodiment of FIG. 2. FIG. 4 shows the principal components of an alternative push-pull inverter stage for the present invention. The gates of transistors Q1 and Q2 are connected to pulse width modulation control circuit 6 of FIG. 2 in this embodiment. Note that C10 and C11 are used to set up the resonant phenomenon so that low switching loss of the FET can be achieved.

Figure 5:
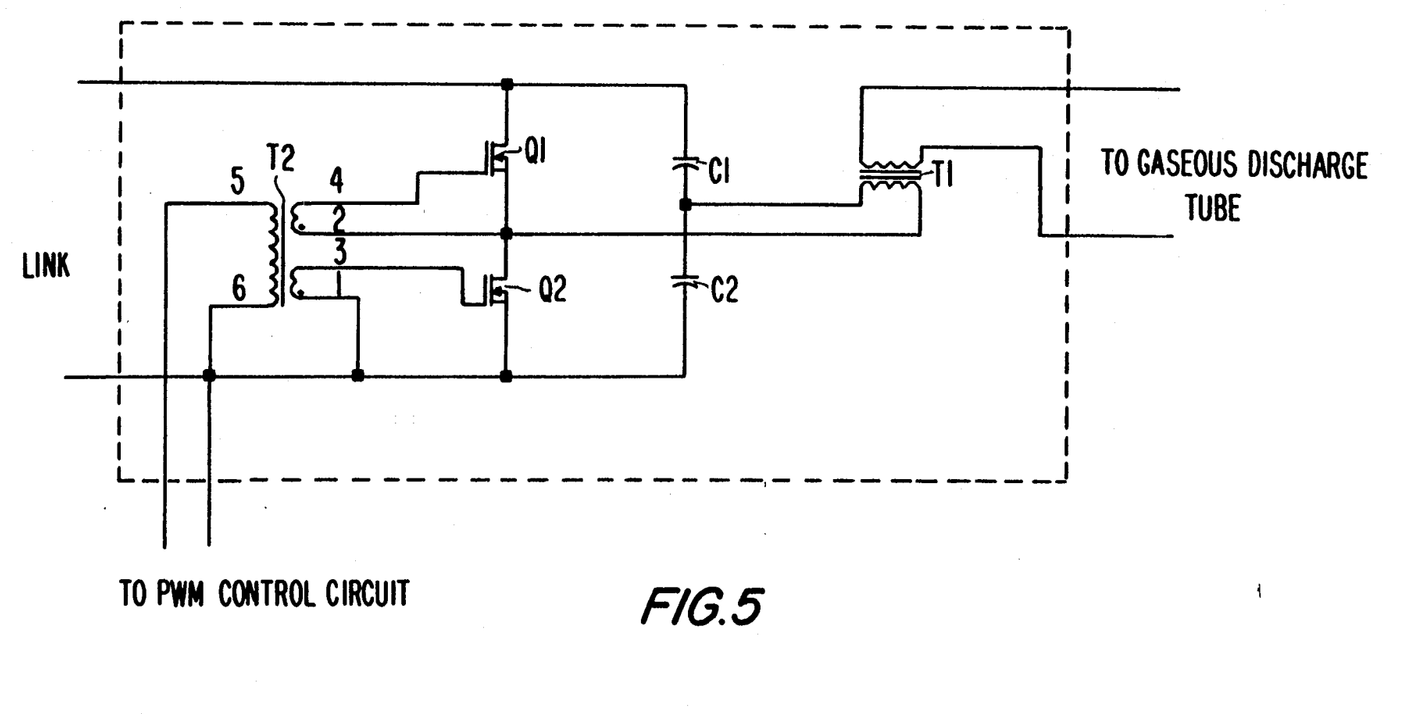
FIG. 5 illustrates an alternative inverter power stage (half-bridge) for the present invention.

FIG. 5 shows another alternative half-bridge inverter stage for the present invention. In this embodiment the primary winding of transformer T2 is connected to the pulse width modulation control circuit 6 of FIG. 2 and the secondary windings are connected to the gates of transistors Q1 and Q2.

Figure 6:
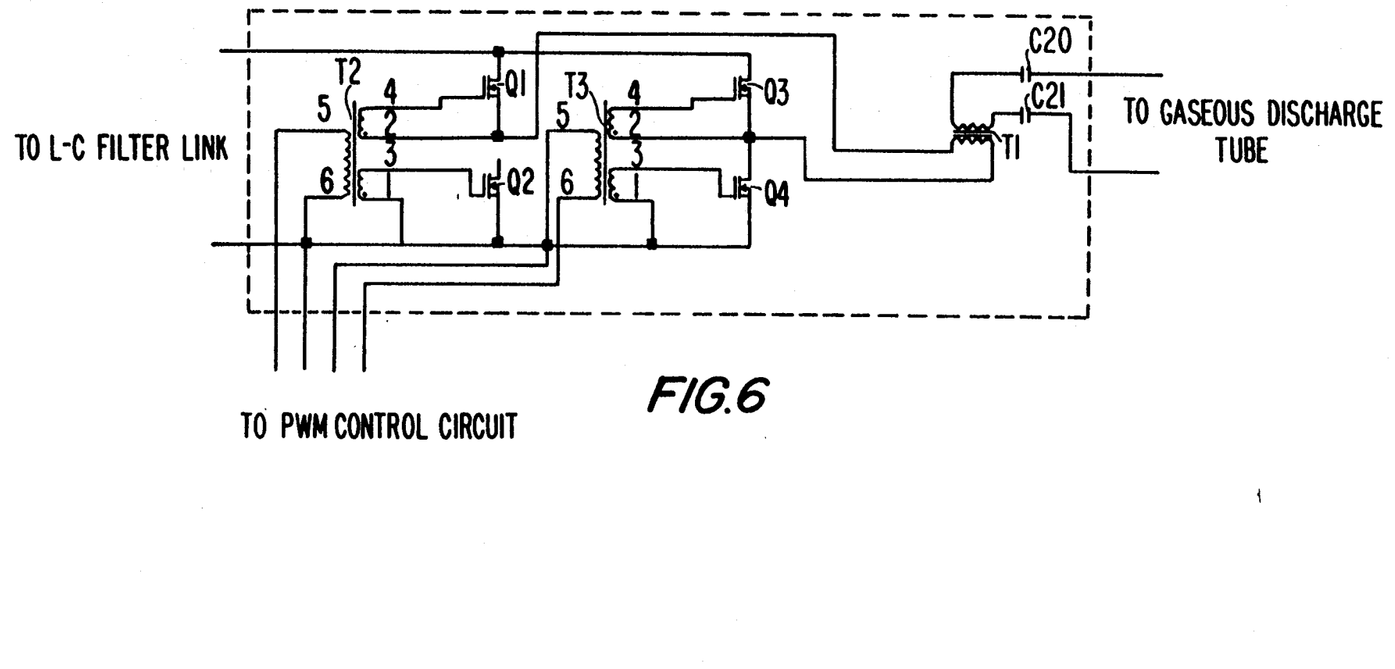
FIG. 6 illustrates an alternative inverter power stage (full-bridge) for the present invention.

FIG. 6 shows yet another alternative full-bridge inverter stage that can be used to embody the present invention. In this embodiment the primary windings of transformers T2 and T3 are connected to the pulse width modulation control circuit 6 of FIG. 2. The secondary windings of transformer T2 are connected to the gates of transistors Q1 and Q2 and the secondary windings of transformer T3 are connected to the gates of transistors Q3 and Q4.

It is to be understood that while certain forms of the present invention have been illustrated and described herein, it is not to be limited to the specific forms or arrangements of parts described and shown.

What is claimed is:

1. A high power factor electronic transformer system for use with a rectifier, comprising:
    an inverter circuit connected to a rectified voltage from the rectifier for producing a high-frequency voltage therefrom;
    a first capacitor connected across a first input terminal and a second input terminal of said inverter circuit;
    an inductor connected between the first input terminal of said inverter circuit and a first output terminal of the rectifier and a second output terminal of the rectifier being connected to said second input terminal of said inverter circuit;
    switch means with an open state and a closed state;
    said inverter circuit including a transformer having a secondary winding connected to a load and a primary winding connected at one end to said first input terminal of said inverter circuit and at a second end to said switch means;
    a second capacitor connected in parallel with said switch means; and
    control means for controlling said switch means so that a sinusoidal input current input to the rectifier remains substantially sinusoidal.

2. A high power factor electronic transformer system for a gaseous discharge tube, comprising:
    a rectifier circuit connected to an alternating current voltage source and producing a rectified voltage therefrom;
    an inverter circuit having positive and a negative input terminals and including a transformer for producing a high-frequency voltage;
    an inductor connected between a positive output terminal of said rectifier circuit and said positive input terminal of said inverter circuit;
    a first capacitor connected across said positive and negative input terminals of said inverter circuit;
    a semiconductor control switch;
    said transformer having a secondary winding connected to provide the high-frequency voltage to the gaseous discharge tube and a primary winding connected at one end to said positive input terminal of said inverter circuit and at a second end to a drain of said control switch;
    a source of said control switch connected to said negative input terminal of said inverter circuit and to said first capacitor;
    a second capacitor connected between said drain and said source of said semiconductor control switch; and
    means for controlling said semiconductor control switch connected to a gate of said switch, wherein an inductance of the transformer, a capacitance of the second capacitor, and a switching frequency of the means for controlling are chosen so that the semiconductor control switch will conduct electricity between the drain and the source when a voltage across the drain and the source is at a minimum, and whereby a sinusoidal input current input to said rectifier circuit remains substantially sinusoidal.

3. The high power factor electronic transformer system according to claim 2, wherein said inverter circuit comprises a push-pull inverter with a third capacitor connected in series between the gaseous discharge tube and a first end of the secondary winding and a fourth capacitor connected in series between the gaseous discharge tube and a second end of the secondary winding.

4. The high power factor electronic transformer system according to claim 2, wherein said inverter circuit comprises a half-bridge inverter.

5. The high power factor electronic transformer system according to claim 2, wherein said inverter circuit comprises a full-bridge inverter with a third capacitor connected in series between the gaseous discharge tube and a first end of the secondary winding and a fourth capacitor connected in series between the gaseous discharge tube and a second end of the secondary winding.

6. The high power factor electronic transformer system according to claim 2, wherein said gaseous discharge tube is a fluorescent lamp.

7. The high power factor electronic transformer system according to claim 2, wherein said means for controlling said semiconductor control switch comprises a pulse width modulation control circuit with a variable pulse width.

8. The high power factor electronic transformer system according to claim 7, wherein an output power to the gaseous discharge tube is adjustable through pulse width adjustment by said pulse width modulation control circuit.

9. The high power factor electronic transformer system according to claim 8, wherein said pulse width modulation control circuit further comprises an over-voltage/over-current protection circuit for measuring voltage across and current through said semiconductor control switch and to stop current through said semiconductor control switch when said voltage across said semiconductor control switch or said current through said semiconductor control switch exceeds respective predetermined limits.

10. The high power factor electronic transformer according to claim 9, wherein said over-voltage/over-current protection circuit comprises:
    a current sensing resistor connected in series with the control switch;
    first and second series-connected resisters forming a voltage divider for voltage sensing and connected in parallel with said second capacitor; and
    means for comparing a current sensed by said current sensing resistor to a current reference level and for comparing a voltage sensed by said voltage divider to a voltage reference level;

whereby when said means for comparing detects that the current sensed by said current sensing resistor is greater than said current reference level or said voltage sensed by said voltage divider is greater than said voltage reference level, current flow through said control switch is stopped by said over-voltage/over-current protection circuit.

11. The high power factor electronic transformer system according to claim 10, wherein said over-voltage/over-current protection circuit further comprises first and second diodes, said first and second diodes being connected to said means for comparing by respective first and second cathodes, an anode of said first diode being connected between the source of the semiconductor control switch and the current sensing resistor and an anode of the second diode being connected between said first and second series-connected resistors forming a voltage divider.

12. The high power factor electronic transformer system according to claim 11, wherein said over-voltage/over-current protection circuit further comprises a light emitting diode fault indicator for illuminating when said current sensed by said current sensing resistor is greater than said current reference level or said voltage sensed by said voltage divider is greater than said voltage reference level.

* * * * *